United States Patent
Kobayashi et al.

(10) Patent No.: US 7,758,767 B2
(45) Date of Patent: Jul. 20, 2010

(54) OXIDE MAGNETIC MATERIAL AND SINTERED MAGNET

(75) Inventors: Yoshinori Kobayashi, Osaka (JP); Seiichi Hosokawa, Osaka (JP); Sachio Toyota, Saga (JP)

(73) Assignee: Neomax Co., Ltd., Osaka (JP)

( * ) Notice: Subject to any disclaimer, the term of this patent is extended or adjusted under 35 U.S.C. 154(b) by 0 days.

(21) Appl. No.: 10/592,488

(22) PCT Filed: Sep. 8, 2005

(86) PCT No.: PCT/JP2005/016548

§ 371 (c)(1),
(2), (4) Date: Sep. 12, 2006

(87) PCT Pub. No.: WO2006/028185

PCT Pub. Date: Mar. 16, 2006

(65) Prior Publication Data

US 2007/0194269 A1 Aug. 23, 2007

(30) Foreign Application Priority Data

Sep. 10, 2004 (JP) .............................. 2004-264568

(51) Int. Cl.
*H01F 1/11* (2006.01)
*C04B 35/26* (2006.01)
(52) U.S. Cl. ................... 252/62.62; 252/62.57
(58) Field of Classification Search .......... 252/62.51 R, 252/62.57, 62.62
See application file for complete search history.

(56) References Cited

U.S. PATENT DOCUMENTS

| 6,139,766 | A | 10/2000 | Taguchi et al. | |
| 6,258,290 | B1 | 7/2001 | Taguchi et al. | |
| 6,402,980 | B1 * | 6/2002 | Taguchi et al. | 252/62.63 |
| 6,419,847 | B1 * | 7/2002 | Toyota et al. | 252/62.57 |
| 6,929,758 | B2 * | 8/2005 | Oda et al. | 252/62.63 |
| 2004/0053075 | A1 | 3/2004 | Oda et al. | |
| 2004/0061090 | A1 | 4/2004 | Oda et al. | |

FOREIGN PATENT DOCUMENTS

| JP | 05-182820 | 7/1993 |
| JP | 10-149910 | 6/1998 |

(Continued)

OTHER PUBLICATIONS

R. Grössinger et al., "Magnetic properties of a new family of rare-earth substituted ferrites", Physica B Condensed Matter, 2003, ISSN 0921-4526, pp. 202-207.

(Continued)

*Primary Examiner*—C. Melissa Koslow
(74) *Attorney, Agent, or Firm*—Nixon Peabody LLP; Jeffrey L. Costellia

(57) ABSTRACT

An oxide magnetic material according to the present invention is represented by the formula: $(1-x)\text{CaO}\cdot(x/2)\text{R}_2\text{O}_3\cdot(n-y/2)\text{Fe}_2\text{O}_3\cdot y\text{MO}$, where R is at least one element selected from the group consisting of La, Nd and Pr and always includes La, M is at least one element selected from the group consisting of Co, Zn, Ni and Mn and always includes Co, and the mole fractions x, y and n satisfy $0.4 \leq x \leq 0.6$, $0.2 \leq y \leq 0.35$, $4 \leq n \leq 6$, and $1.4 \leq x/y \leq 2.5$. The oxide magnetic material includes a ferrite having a hexagonal M-type magnetoplumbite structure as a main phase.

10 Claims, 8 Drawing Sheets

FOREIGN PATENT DOCUMENTS

| | | |
|---|---|---|
| JP | 2001-069728 | 3/2001 |
| WO | WO 03/033432 A1 | 4/2003 |

OTHER PUBLICATIONS

Notice of Reasons for Rejection of Japanese Patent Application No. 2005-261088 issued Feb. 3, 2009.

Tenaud, P. et al., "Recent improvement of Hard Ferrite Permanent Magnets Based on La-Co Substitution", Journal of Alloys and Compounds, NL, Elsevier, May 12, 2004, vol. 370, pp. 331-334.

Notice of Reasons for Rejection of Japanese Patent Application No. 2005-261088 issued Aug. 4, 2009 (with English translation).

Notice of Final Rejection of Japanese Patent Application No. 2005-261088 issued Jan. 12, 2010 (with English translation).

* cited by examiner

OXIDE MAGNETIC MATERIAL AND SINTERED MAGNET

TECHNICAL FIELD

The present invention relates to an oxide magnetic material and a sintered magnet, each including a ferrite with an M type magnetoplumbite structure as a main phase, and methods of making them.

BACKGROUND ART

Ferrite is a generic term for any compound including an oxide of a divalent cationic metal and trivalent iron, and ferrite magnets have found a wide variety of applications in numerous types of rotating machines, loudspeakers, and so on. Typical materials for a ferrite magnet include Sr ferrites ($SrFe_{12}O_{19}$) and Ba ferrites ($BaFe_{12}O_{19}$) having a hexagonal magnetoplumbite structure. Each of these ferrites is made of iron oxide and a carbonate of strontium (Sr), barium (Ba) or any other suitable element, and can be produced at a relatively low cost by a powder metallurgical process.

Recently, it was proposed that the coercivity HcJ and the remanence Br of an Sr ferrite be increased by substituting a rare-earth element such as La for a portion of Sr and by substituting Co for a portion of Fe (see Patent Documents Nos. 1 and 2).

Just like the Sr ferrite, it was also proposed that a rare-earth element such as La be substituted for a portion of Ca in a Ca ferrite and that Co be substituted for a portion of Fe (see Patent Document No. 3).

Patent Document No. 1: Japanese Patent Application Laid-Open Publication No. 10-149910

Patent Document No. 2: Japanese Patent Application Laid-Open Publication No. 11-154604

Patent Document No. 3: Japanese Patent Application Laid-Open Publication No. 2000-223307

DISCLOSURE OF INVENTION

Problems to be Solved by the Invention

As for Ca ferrites, it is known that the structure CaO—$Fe_2O_3$ or CaO-2$Fe_2O_3$ has good stability and produces a hexagonal ferrite when La is added thereto. However, the resultant magnetic properties are as good as those of a conventional Ba ferrite and are not sufficiently high. Thus, to increase the remanence Br and coercivity HcJ and improve the temperature dependence of the coercivity HcJ, Patent Document No. 3 discloses a Ca ferrite including both La and Co (which will be referred to herein as a "CaLaCo ferrite").

In the CaLaCo ferrite disclosed in Patent Document No. 3, a portion of Ca is replaced with a rare-earth element such as La and a portion of Fe is replaced with Co and so on. As for its anisotropic magnetic field $H_A$, it is reported that a value of 20 kOe or more, which is more than 10% higher than the anisotropic magnetic field $H_A$ of an Sr ferrite, was achieved at best.

According to the working examples of the CaLaCo ferrite disclosed in Patent Document No. 3, if x=y=0 to 1 and z=1 in $Ca_{1-x1}La_{x1}(Fe_{12-x1}CO_{x1})_zO_{19}$, good properties are achieved when x=y=0.4 to 0.6. More specifically, Br=4.0 kG (=0.40 T) and HcJ=3.7 kOe (=294 kA/m) were achieved when baking was carried out in the air and Br=4.0 kG (=0.40 T) and HcJ=4.2 kOe (=334 kA/m) were achieved when baking was carried out in oxygen (i.e., in 100% oxygen).

On the other hand, if the z value was decreased to 0.85 (and x=0.5, y=0.43 and x/y=1.16) in the composition described above, Br=4.4 kG (=0.44 T) and HcJ=3.9 kOe (=310 kA/m) were achieved when baking was carried out in the air and Br=4.49 kG (=0.449 T) and HcJ=4.54 kOe (=361 kA/m) were achieved when baking was carried out in oxygen (i.e., in 100% oxygen). The latter property is the best property achievable by Patent Document No. 3.

An Sr ferrite in which a portion of Sr is replaced with a rare-earth element such as La and a portion of Fe is replaced with Co and so on according to Patent Documents Nos. 1 and 2 (which will be referred to herein as an "SrLaCo ferrite") has such excellent magnetic properties as to be often used in various applications in place of the conventional Sr ferrite or Ba ferrite.

Ferrite magnets are used most frequently in motors. If the magnetic properties of a ferrite magnet improve, then the output of a motor can be increased or the size thereof can be reduced. That is why it is very effective to increase the remanence Br, coercivity HcJ and maximum energy product (BH)max. However, not only these properties but also the loop squareness Hk/HcJ must be good. This is because if the loop squareness were poor, then the critical demagnetization field strength would be so small as to cause demagnetization easily. In motors among other things, when embedded in a magnetic circuit, a ferrite magnet easily demagnetizes, which is regarded as a non-negligible problem. To overcome such a problem, there is a high demand for a high-performance ferrite magnet that has high coercivity HcJ (or high coercivity HcJ and high remanence Br) and good loop squareness. It should be noted that the parameter Hk, which is measured to evaluate the loop squareness, is an abscissa (i.e., an H value) corresponding to a 4πI value of 0.95 Br in the second quadrant of a 4πI (degree of magnetization)-H (strength of magnetic field) curve. The Hk/HcJ ratio, calculated by dividing this Hk value by the HcJ of the demagnetization curve, is defined as the loop squareness.

The CaLaCo ferrite according to Patent Document No. 3 has as good magnetic properties as the SrLaCo ferrite and is a material, of which the applications are expected to expand greatly in the near future. But the CaLaCo ferrite has very bad loop squareness Hk/HcJ. As described above, according to Table 2 in Example 2 of Patent Document No. 3, excellent properties including Br=4.49 kG (=0.449 T) and HcJ=4.54 kOe (=361 kA/m) are achieved but its loop squareness is only 80.6%.

In FIG. 14 of Patent Document No. 3 (see Example 10 thereof), shown is the loop squareness in a situation where x1=0 to 1 in $Ca_{1-x1}La_{x1}Fe_{12-x1}CO_{x1}$. However, when x=y=0.4 to 0.6, which is a preferred range according to Patent Document No. 3, the loop squareness is about 80%. If x1 is 0.8, then the loop squareness exceeds 85% but the coercivity HcJ decreases steeply.

Also, in FIG. 15 of Patent Document No. 3 (see Example 11 thereof), shown is the loop squareness in a situation where x2=0, 0.2 or 0.4 in $Sr_{0.4-x2}Ca_{x2}La_{0.6}Fe_{11.4}CO_{0.6}$. The loop squareness exceeds 90% when x2=0 or 0.2 (i.e., in a range where there is a lot of Sr) but is 80% or less when x2=0.4 (i.e., full Ca). In this case, the behavior of the coercivity HcJ is quite opposite to that of the loop squareness. And the highest coercivity HcJ is achieved when x2=0.4 (i.e., full Ca).

As described above, the CaLaCo ferrite according to Patent Document No. 3 exhibits better properties than the SrLaCo ferrite as for the anisotropic magnetic field $H_A$ and its Br and HcJ are as high as those of an SrLaCo ferrite. However, its loop squareness is poor and high coercivity and good loop squareness cannot be satisfied at the same time. Consequently, the CaLaCo ferrite cannot be used in motors and various other applications yet.

In order to overcome the problems of the conventional CaLaCo ferrite described above, an object of the present invention is to provide an oxide magnetic material and a sintered magnet that have increased Br and HcJ and improved loop squareness.

Means to Solve the Problems

This object is achieved by any of the following subject matters:

(1) An oxide magnetic material having a composition represented by the formula:

$(1-x)CaO\cdot(x/2)R_2O_3\cdot(n-y/2)Fe_2O_3\cdot yMo$, where R is at least one element selected from the group consisting of La, Nd and Pr and always includes La, M is at least one element selected from the group consisting of Co, Zn, Ni and Mn and always includes Co, and the mole fractions x, y and n satisfy $0.4 \leq x \leq 0.6$, $0.2 \leq y \leq 0.35$, $4 \leq n \leq 6$, and $1.4 \leq x/y \leq 2.5$, wherein the oxide magnetic material includes a ferrite having a hexagonal M-type magnetoplumbite structure as a main phase.

(2) The oxide magnetic material of (1), wherein $4.8 \leq n \leq 5.8$ is satisfied.

(3) A sintered magnet comprising the oxide magnetic material of (1) or (2).

(4) The sintered magnet of (3), wherein the sintered magnet has a coercivity HcJ of 370 kA/m or more.

(5) The sintered magnet of (3), wherein the sintered magnet has a remanence Br of 0.45 T or more.

(6) The sintered magnet of (3), wherein the sintered magnet has a loop squareness Hk/HcJ of at least 85%.

(7) The sintered magnet of (6), wherein the loop squareness Hk/HcJ is 90% or more.

(8) A method of making the oxide magnetic material of (1) or (2), comprising the step of adding at most 0.2 mass % of $H_3BO_3$ before and/or after the step of calcining.

(9) A method for producing the sintered magnet of (3), comprising the step of adding 1.0 mass % or less of $SiO_2$ and 1.5 mass % or less of $CaCO_3$, when converted into the mass of CaO, before the step of fine pulverization.

(10) A method of making the oxide magnetic material of (1) or (2), comprising the step of setting the oxygen concentration of a calcining atmosphere at 5% or more.

(11) A method for producing the sintered magnet of (3), comprising the step of setting the oxygen concentration of a sintering atmosphere at 10% or more.

(12) An oxide magnetic material consisting essentially of Ca, La, Fe and Co and comprising a ferrite having a hexagonal M-type magnetoplumbite structure as a main phase, wherein the oxide magnetic material includes substantially no hetero phases including a lot of Co.

Effect of Invention

According to the present invention, an oxide magnetic material that has increased Br, increased HcJ and improved loop squareness can be provided.

If a sintered magnet is made of the oxide magnetic material of the present invention, a coercivity HcJ of 370 kA/m or more is achieved in a preferred embodiment and a remanence Br of 0.45 T or more is achieved in a preferred embodiment.

If a sintered magnet is made of the oxide magnetic material, a loop squareness of at least 85% is achieved in a preferred embodiment, and a loop squareness of 90% or more is achieved in an even preferred embodiment.

According to the present invention, Br and HcJ that are higher than those of the SrLaCo ferrites disclosed in Patent Documents Nos. 1 and 2 are achieved.

Also, according to the present invention, properties that are at least comparable to Br and HcJ in a situation where the CaLaCo ferrite of Patent Document No. 3 is baked in oxygen (in 100% oxygen) are achieved (i.e., the best properties of Patent Document No. 3 are achieved) even when the baking process is carried out in the air. This is effective because the baking process in the air can be carried out more easily, and guarantees more constant production, than in oxygen.

A sintered magnet according to the present invention has such high Br, high HcJ and good loop squareness as to find its best applications in motors and so on.

BEST MODE FOR CARRYING OUT THE INVENTION

Figure 1:
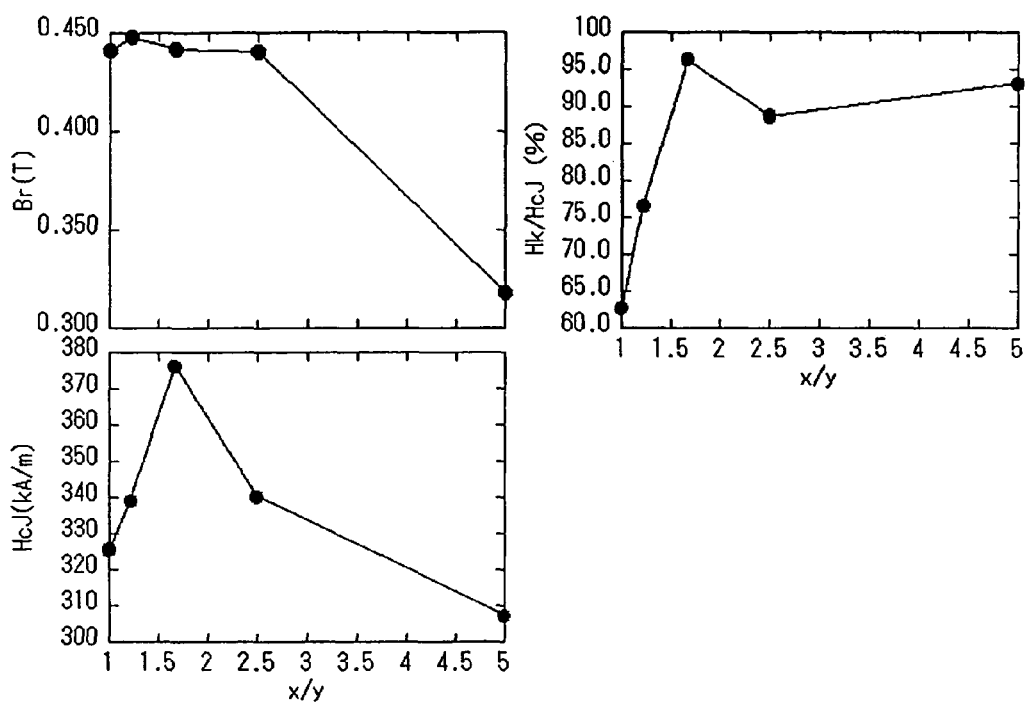
FIG. 1 is graphs showing how the remanence Br, coercivity HcJ and Hk/HcJ of a sintered magnet change with the molar ratio x/y in a situation where n=5.4 and the x/y ratio of the mole fraction x of substitutent La to the mole fraction y of substitutent Co is changed from 1.0 to 5.0 in the composition $(1-x)CaO\cdot(x/2)La_2O_3\cdot(n-y/2)Fe_2O_3\cdot yCoO$.

An oxide magnetic material according to the present invention is represented by the general formula:

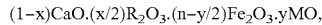

$(1-x)CaO \cdot (x/2)R_2O_3 \cdot (n-y/2)Fe_2O_3 \cdot yMO$,

The present inventors paid special attention to the fact that the CaLaCo ferrite has higher anisotropic magnetic field $H_A$ than the SrLaCo ferrite and carried out extensive researches on how to improve the performance of the CaLaCo ferrite. As a result, the present inventors discovered that the CaLaCo ferrite represented by the above formula had best ranges for its R mole fraction x, its M mole fraction y and its n value and that an oxide magnetic material having high Br, high HcJ and good loop squareness could be obtained by getting R and M included such that x and y satisfied a particular ratio. R and M will be described in detail later.

A CaLaCo ferrite is disclosed in Patent Document No. 3. The preferred range of x and y should be from 0.4 to 0.6 according to the description of its examples. As for the x/y ratio, basically, x=y (i.e., x/y=1) is supposed to be satisfied. And only examples in which x/y=1.05 and x/y=1.16 are shown. It should be noted that in Patent Document No. 3, the mole fraction of Fe and Co in the general formula representing its composition is represented by z and there is no description about the n value.

As described above, the CaLaCo ferrite of Patent Document No. 3 has high Br and high HcJ but has poor loop squareness Hk/HcJ. This is probably because if the CaLaCo ferrite satisfies x=y=0.4 to 0.6, then hetero phases including a lot of Co will be produced in the crystal structure, thus causing the decrease in loop squareness.

The present inventors looked for a composition that would not produce such hetero phases. As a result, the present inventors discovered that by adopting an x range of 0.4 to 0.6, a lower y range of 0.2 to 0.35, and an x/y ratio of 1.4 to 2.5, a material with high Br and high HcJ could be obtained. In a preferred embodiment of the present invention, magnetic properties including an HcJ of 370 kA/m or more and a Br of 0.45 T or more, both of which are superior to the best properties disclosed in Patent Document No. 3, are achieved. According to the present invention, a loop squareness of 85% or more is achieved in a broad range in which $4 \leq n \leq 6$ was satisfied, a loop squareness of 90% or more is achieved in a range in which $4.8 \leq n \leq 5.8$ was satisfied, and the material with the high Br, high HcJ and a loop squareness of 90% or more was obtained in a range in which $5.0 \leq n \leq 5.4$ was satisfied.

The present invention is an improvement of a CaLaCo ferrite and includes Ca as an essential element. According to the present invention, only Ca is used instead of Sr and Ba.

R is at least one element selected from the group consisting of La, Nd and Pr and always includes La. Other elements, of which the ionic radii are close to $Sr^{2+}$ (e.g., Ce, Sm, Eu and Gd), may be included.

M is at least one element selected from the group consisting of Co, Zn, Ni and Mn and always includes Co. Other elements may be included as long as they are inevitably contained impurities.

According to the present invention, Co may be partially replaced with Zn, Ni or Mn as described above. Any of Zn, Ni and Mn may be adopted as the substitutent because Br and HcJ that are higher than those of the SrLaCo ferrite disclosed in Patent Documents Nos. 1 and 2 are achieved in any case. Particularly, by replacing a portion of Co with Ni, the manufacturing cost can be reduced without deteriorating the magnetic properties. Also, if Co is partially replaced with Zn, HcJ will decrease to a certain degree but Br can be increased. The mole fraction of the substitutent Zn, Ni or Mn is at most 50% of Co.

The mole fraction x shows the content of R and preferably satisfies $0.4 \leq x \leq 0.6$. This is because if x were less than 0.4 or more than 0.6, Br and the loop squareness would decrease.

The mole fraction y shows the content of M and preferably satisfies $0.2 \leq y \leq 0.35$. As described above, a preferred y range for the CaLaCo ferrite was believed to be from 0.4 to 0.6 in the prior art. In that case, however, hetero phases including a lot of Co would be produced in the crystal structure. The present invention is characterized by adopting a y range of 0.2 to 0.35 and by setting a particular x/y ratio as will be described later. If y were less than 0.2, Br and HcJ would both decrease. However, if y were more than 0.35, then hetero phases including a lot of Co would be produced and HcJ would decrease, which is not beneficial.

The n value defining the ratio of CaO and $R_2O_3$ to $Fe_2O_3$ and MO preferably satisfies $4 \leq n \leq 6$, in which a loop squareness Hk/HcJ of 85% or more is achieved. More preferably, n satisfies $4.8 \leq n \leq 5.8$, in which a loop squareness of 90% or more is achieved. By setting the n value in this range and adopting the preferred x and y ranges described above, properties including a Br of 0.45 T or more and an HcJ of 370 kA/m (=4.65 kOe) or more are achieved. Also, in the most preferred range, not only the properties described above but also a loop squareness of 95% or more are achieved. It should be noted that since it is difficult to measure the loop squareness of a calcined body, the loop squareness of a sintered magnet is measured instead.

Hereinafter, a method of making an oxide magnetic material according to the present invention will be described.

First, material powders of $CaCO_3$, $Fe_2O_3$, $La_2O_3$, $Co_3O_4$ and so on are prepared. The prepared powders are combined together such that x, y and n fall within their preferred ranges according to the general formula described above. The material powders may include not just oxides and carbonates but also hydroxides, nitrates and chlorides and may be in the form of solution as well. Also, in producing a sintered magnet, the material powders other than $CaCO_3$, $Fe_2O_3$ and $La_2O_3$ may be added either when the powders are mixed or after the calcining process (to be described later) is finished. For example, after $CaCO_3$, $Fe_2O_3$ and $La_2O_3$ have been combined, mixed together and calcined, $Co_3O_4$ and so on may be added thereto and the mixture may be pulverized, compacted and then sintered. Optionally, to promote the reactivity during the calcining process, approximately 1 mass % of a compound including $B_2O_3$ and $H_3BO_3$ may be added.

Among other things, the addition of $H_3BO_3$ is particularly effective in increasing HcJ and Br. $H_3BO_3$ is preferably added up to 0.2 mass %, most preferably in the vicinity of 0.1 mass %. In that case, as long as the n value and the mole fractions x and y fall within their preferred ranges described above, properties including a Br of 0.45 T or more and an HcJ of 370 kA/m or more are realized. If less than 0.1 mass % of $H_3BO_3$ is added, then Br will increase significantly. On the other hand, if more than 0.1 mass % of $H_3BO_3$ is added, then HcJ will increase noticeably. However, if more than 0.2 mass % of $H_3BO_3$ was added, then Br would decrease, which is not beneficial. That is why when used in applications in which Br plays a key role, 0.05 mass % to 0.15 mass % of $H_3BO_3$ is preferably added. Meanwhile, when used in applications in which HcJ plays an important role, 0.10 mass % to 0.20 mass % of $H_3BO_3$ is preferably added. $H_3BO_3$ also has the effect of controlling crystal grains during a sintering process. For that reason, it is also effective to add $H_3BO_3$ after the calcining process (i.e., before the fine pulverization process or before the sintering process). Thus, $H_3BO_3$ may be added both before and after the calcining process.

The material powders may be combined together by either a wet process or a dry process. When stirred up with a medium such as steel balls, the material powders can be mixed more uniformly. In a wet process, water is used as the solvent. Optionally, a known dispersant such as ammonium polycarboxylate or calcium gluconate may be used in order to disperse the material powders. The mixed material slurry is dehydrated to be a mixed material powder.

Next, the material powder mixture is heated by using an electric furnace or a gas furnace, for example, thereby producing a ferrite compound having a magnetoplumbite structure through a solid-phase reaction. This process will be referred to herein as "calcining" and a compound obtained by this process will be referred to herein as a "calcined body".

The calcining process is preferably carried out in an atmosphere with an oxygen concentration of 5% or more. This is because the solid-phase reaction would not advance smoothly in an atmosphere that has an oxygen concentration of less than 5%. More preferably, the oxygen concentration is 20% or more.

In the calcining process, as the temperature rises, a ferrite phase is gradually formed through the solid-phase reaction. The formation of the ferrite phase is completed at about 1,100° C. If the calcining process were finished at a temperature lower than about 1,100° C., then unreacted hematite would remain to deteriorate the resultant magnet properties. The effects of the present invention are achieved if the calcining temperature exceeds 1,100° C. However, if the calcining temperature exceeded 1,450° C., then various inconveniences might be created. For example, crystal grains might grow so much that it would take a lot of time to pulverize the powder in the subsequent pulverizing process step. In view of these considerations, the calcining temperature is preferably in the range of 1,100° C. to 1,450° C., more preferably 1,200° C. to 1,350° C. Also, the calcining process is preferably carried out for 0.5 to 5 hours.

If $H_3BO_3$ has been added before the calcining process, then the above reaction will be promoted so much that the calcining process can be carried out at a temperature of 1,100° C. to 1,300° C.

The calcined body obtained by this calcining process has a main phase of a ferrite having a hexagonal M-type magnetoplumbite structure represented by the chemical formula:

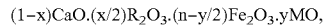

$(1-x)CaO.(x/2)R_2O_3.(n-y/2)Fe_2O_3.yMO$, where $0.4 \leq x \leq 0.6$, $0.2 \leq y \leq 0.35$ and $4 \leq n \leq 6$, and becomes the oxide magnetic material of the present invention.

By pulverizing and/or crushing such a calcined body, a magnetic powder can be obtained and can be used to make a bonded magnet or a magnetic recording medium. Optionally, the calcined body may be made by a known manufacturing technique such as a spray pyrolysis process or a coprecipitation process.

When used to make a bonded magnet, the magnetic powder is mixed with a rubber with some flexibility or a hard and lightweight plastic. Then, the mixture is subjected to a compaction process, which may be carried out by a method such as injection molding, extrusion molding or roll molding. Also, when applied to a bonded magnet, the magnetic powder is preferably thermally treated at a temperature of 700° C. to 1,100° C. for about 0.1 to about 3 hours in order to relax the crystal strain of the magnetic powder. A more preferred temperature range is from 900° C. to 1,000° C.

Meanwhile, when used to make a magnetic recording medium, the magnetic powder may be subjected to the heat treatment process described above, mulled with any of various known binders, and then the mixture is applied onto a substrate. In this manner, a coated magnetic recording medium can be obtained. Alternatively, a thin-film magnetic layer for use in a magnetic recording medium may be formed by a sputtering process, for example, with the oxide magnetic material of the present invention and a sintered magnet including the material used as a target.

Next, a method for producing a sintered magnet using this oxide magnetic material will be described.

The calcined body is subjected to a fine pulverization process using a vibrating mill, a ball mill and/or an attritor so as to be pulverized into fine powder particles having a mean particle size of about 0.4 μm to about 0.8 μm as measured by the air permeability method. The fine pulverization process may be either dry pulverization or wet pulverization but is preferably carried out as a combination of these two types of pulverization processes.

The wet pulverization process may be carried out using an aqueous solvent such as water or any of various non-aqueous solvents including organic solvents such as acetone, ethanol and xylene. As a result of the wet pulverization process, slurry is produced as a mixture of the solvent and the calcined body. Any of various known dispersants or surfactants is preferably added to the slurry at a solid matter ratio of 0.2 mass % to 2.0 mass %. After the wet pulverization process is over, the slurry is preferably condensed and mulled.

In the fine pulverization process, $CaCO_3$, $SiO_2$, $Cr_2O_3$ or $Al_2O_3$ may be added to the calcined body to improve the magnetic properties thereof. If any of these additives is added, 0.3 mass % to 1.5 mass % of $CaCO_3$ when converted into the mass of CaO, 0.2 mass % to 1.0 mass % of $SiO_2$, at most 5.0 mass % of $Cr_2O_3$ or at most 5.0 mass % of $Al_2O_3$ is preferably added when converted into CaO.

Among other things, it is particularly effective to add $CaCO_3$ and/or $SiO_2$. And if $CaCO_3$ and/or $SiO_2$ and $H_3BO_3$ are added in combination, high Br and high HcJ are achieved. $SiO_2$ also has the effect of controlling crystal grains during the calcining process. For that reason, it is also effective to add $SiO_2$ before the calcining process. Thus, $SiO_2$ may be added both before the calcining process and before the fine pulverization process.

Thereafter, the slurry is pressed and compacted with or without a magnetic field applied thereto, while the solvent is removed from the slurry. By pressing and compacting the slurry under a magnetic field, the crystallographic orientations of the powder particles can be aligned with each other. As a result of the compaction process under the magnetic field, the magnetic properties can be improved significantly. Optionally, to further align the orientations, 0.01 mass % to 1.0 mass % of dispersant or lubricant may be added.

The compacts formed by the compaction process are subjected to a degreasing process, if necessary, and then to a sintering process, which may be carried out using an electric furnace or a gas furnace, for example.

The sintering process is preferably carried out in an atmosphere that has an oxygen concentration of at least 10%. If the oxygen concentration were lower than 10%, then excessive particle growth would be caused and/or hereto phases would be produced, thus possibly deteriorating the magnetic properties, which is a problem. The oxygen concentration is more preferably 20% or more, and most preferably 100%.

As will be described later by way of specific examples, even when baked in the air, the oxide magnetic material of the present invention exhibits magnetic properties that are at least as good as those realized by baking the CaLaCo ferrite in oxygen (i.e., in 100% oxygen) as disclosed in Patent Document No. 3. That is why by baking the oxide magnetic material of the present invention in oxygen just as disclosed in Patent Document No. 3, even better magnetic properties are realized.

The sintering process is preferably carried out at a temperature of 1,150° C. to 1,250° C. for 0.5 to 2 hours. A sintered magnet obtained by the sintering process has an average crystal grain size of approximately 0.5 μm to approximately 2 μm.

After having been sintered, the sintered compact is subjected to various known manufacturing processing steps including finishing, cleaning and testing to complete a ferrite sintered magnet as a final product.

EXAMPLES

Example 1

First, a $CaCO_3$ powder, an $La_2O_3$ powder, an $Fe_2O_3$ powder (with a particle size of 0.6 μm) and $Co_3O_4$, were prepared and mixed together such that a composition $(1-x)CaO.(x/2)La_2O_3.(n-y/2)Fe_2O_3.yCoO$ would satisfy $x=0.5$, $1 \leq x/y$, $0 \leq y \leq 0.5$ and $n=5.4$. The resultant material powders were mixed together in a wet ball mill for four hours, dried, and then sieved. Thereafter, the powder was calcined in the air at 1,300° C. for three hours, thereby obtaining a calcined body in the form of powder.

Next, 0.6 mass % of $CaCO_3$ powder (when converted into the mass of CaO) and 0.45 mass % of $SiO_2$ powder were further added to the calcined body. Then, using water as a solvent, the mixture was finely pulverized in a wet ball mill to a mean particle size of 0.55 μm as measured by the air permeability method. Thereafter, while the solvent was removed from the resultant finely pulverized slurry, the slurry was pressed and compacted under a magnetic field. The compaction process was performed such that the pressing direction became parallel to the direction of the magnetic field, which had a strength of 13 kOe. Next, the resultant compact was sintered in the air at 1,150° C. for one hour to make a sintered magnet.

The magnetic properties of the sintered magnet thus produced were measured. When the abscissa represents the x/y ratio of the mole fraction x of La to the mole fraction y of Co, the remanence Br, coercivity HcJ and loop squareness Hk/HcJ measured change as shown in FIG. 1. On the other hand, when the abscissa represents the mole fraction of y added, Br, HcJ and Hk/HcJ change as shown in FIG. 2.

As is clear from FIG. 1, if the x/y ratio was too low, HcJ and Hk/HcJ decreased due to the presence of hetero phases. When x/y was approximately 1.25 or less, HcJ was smaller than 340 kA/m (=4.27 kOe). And when x/y was 1.4 or less, Hk/HcJ was lower than 85%. On the other hand, if the x/y ratio was too high, Br and HcJ decreased. For example, when x/y was approximately 2.5 or more, Br was smaller than 0.44 T and HcJ was smaller than 340 kA/m (=4.27 kOe). In the prior art, the best x/y ratio was believed to be approximately equal to one considering the charge correction relationship. However, it can be seen that the CaLaCo ferrite of the present invention realized high magnetic properties when satisfying $1.4 \leq x/y \leq 2.5$.

Figure 2:
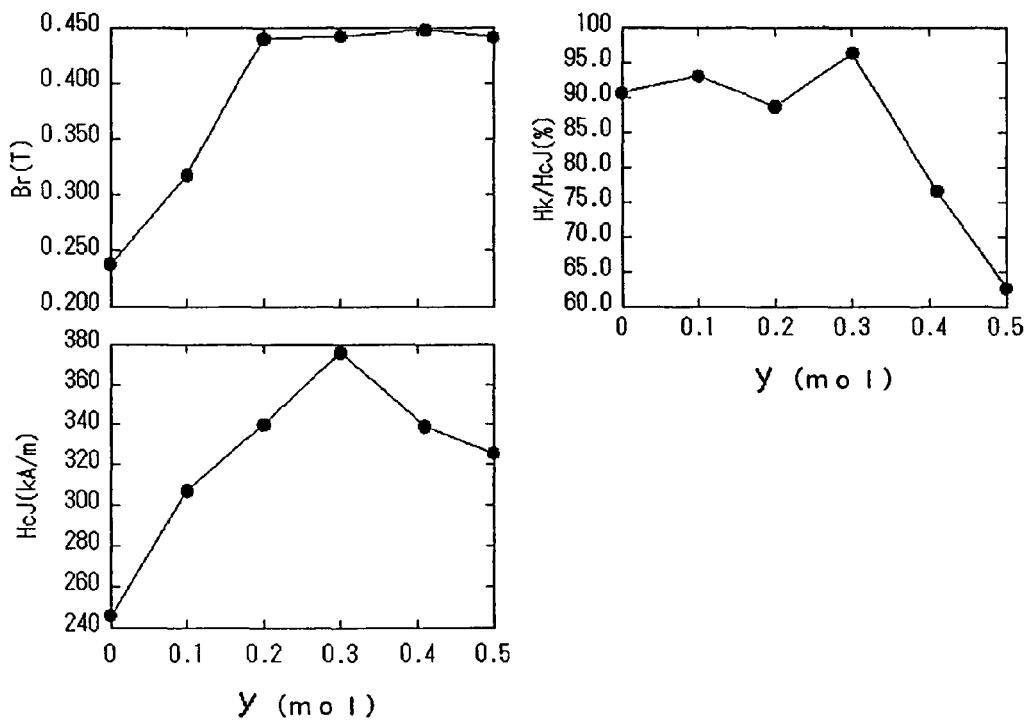
FIG. 2 is graphs showing how the remanence Br, coercivity HcJ and Hk/HcJ of a sintered magnet change with the mole fraction y in a situation where x=0.50, n=5.4 and y is changed from 0 to 0.50 in the composition $(1-x)CaO\cdot(x/2)La_2O_3\cdot(n-y/2)Fe_2O_3\cdot yCoO$.

Also, as is clear from FIG. 2, if the mole fraction of the substitutent Co was too low, Br and HcJ decreased. For example, when y was approximately 0.2 or less, Br was smaller than 0.44 T and HcJ was smaller than 340 kA/m (=4.27 kOe). On the other hand, if the mole fraction of y was too high, HcJ and Hk/HcJ decreased due to the presence of hetero phases. When y was approximately 0.4 or more, HcJ was smaller than 340 kA/m (=4.27 kOe). And when y was 0.35 or more, Hk/HcJ was lower than 85%. It can be seen that high magnetic properties were realized according to the present invention when $0.20 \leq y \leq 0.35$ was satisfied.

Example 2

A sintered magnet was produced as in the first specific example described above except that the composition $(1-x)CaO.(x/2)La_2O_3.(n-y/2)Fe_2O_3.yCoO$ satisfied $x=0.5$, $y=0.3$, $x/y=1.67$, and $3.6 \leq n \leq 6.0$. The magnetic properties of the sintered magnet thus produced were measured. When the abscissa represents the n value, the remanence Br, coercivity HcJ and loop squareness Hk/HcJ measured change as shown in FIG. 3.

Figure 3:
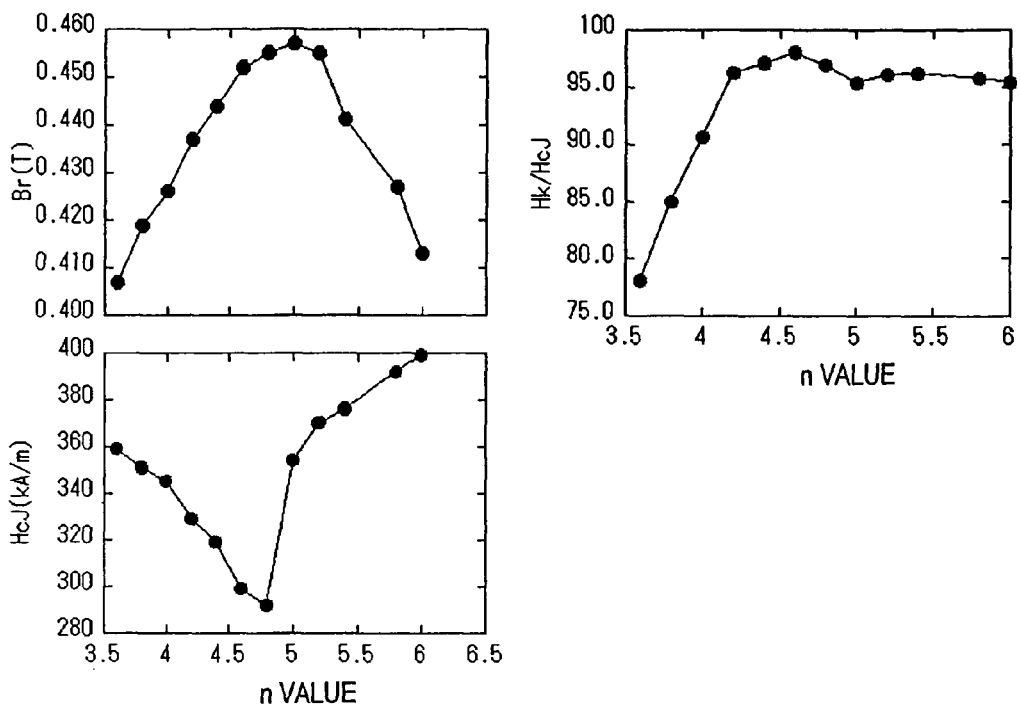
FIG. 3 is graphs showing how the remanence Br, coercivity HcJ and Hk/HcJ of a sintered magnet change with the mole fraction n in a situation where x=0.50, y=0.30 and n is changed from 3.6 to 6.0 in the composition $(1-x)CaO\cdot(x/2)La_2O_3\cdot(n-y/2)Fe_2O_3\cdot yCoO$.

As is clear from FIG. 3, a good loop squareness of 85% or more was achieved in the range in which $4.0 \leq n \leq 6.0$ was satisfied and a better loop squareness of 90% or more was achieved in the range in which $4.8 \leq n \leq 5.8$ was satisfied. Furthermore, when $5.0 \leq n \leq 5.4$ was satisfied, good magnetic properties including a Br of 0.44 T and an HcJ of 340 kA/m (=4.27 kOe) were realized. And when $n=5.2$, an HcJ of 370 kA/m or more and a Br of 0.45 or more were achieved.

Example 3

In the composition of the second specific example, the magnetic properties were measured with n fixed at 5.2 and with the sintering temperature changed within the range of 1,150° C. to 1,190° C. The results are shown in the following Table 1:

TABLE 1

| Sintering temperature (° C.) | Br (T) | HcJ (kA/m) | (BH)max (kJ/m³) | Jr/Js (%) | Hk/HcJ (%) |
|---|---|---|---|---|---|
| 1150 | 0.453 | 370.0 | 40.5 | 98.9 | 97 |
| 1170 | 0.460 | 300.2 | 41.3 | 98.9 | 96 |
| 1190 | 0.464 | 271.2 | 42.0 | 99.1 | 92 |

As can be seen from Table 1, when the sintering temperature was relatively low, a high HcJ of 370 kA/m (=4.65 kOe) and a high Hk/HcJ ratio exceeding 95% were achieved. On the other hand, when the sintering temperature was relatively high, a high Br exceeding 0.46 T and a high Hk/HcJ ratio exceeding 90% were achieved.

Example 4

A sintered magnet was produced as in the first specific example described above except that the composition $(1-x)CaO.(x/2)La_2O_3.(n-y/2)Fe_2O_3.yCoO$ satisfied $0 \leq x \leq 1$, $y=0.3$ and $n=5.2$. The magnetic properties of the sintered magnet thus produced were measured. When the abscissa represents the mole fraction of x added, the remanence Br, coercivity HcJ and loop squareness Hk/HcJ measured change as shown in FIG. 4.

Figure 4:
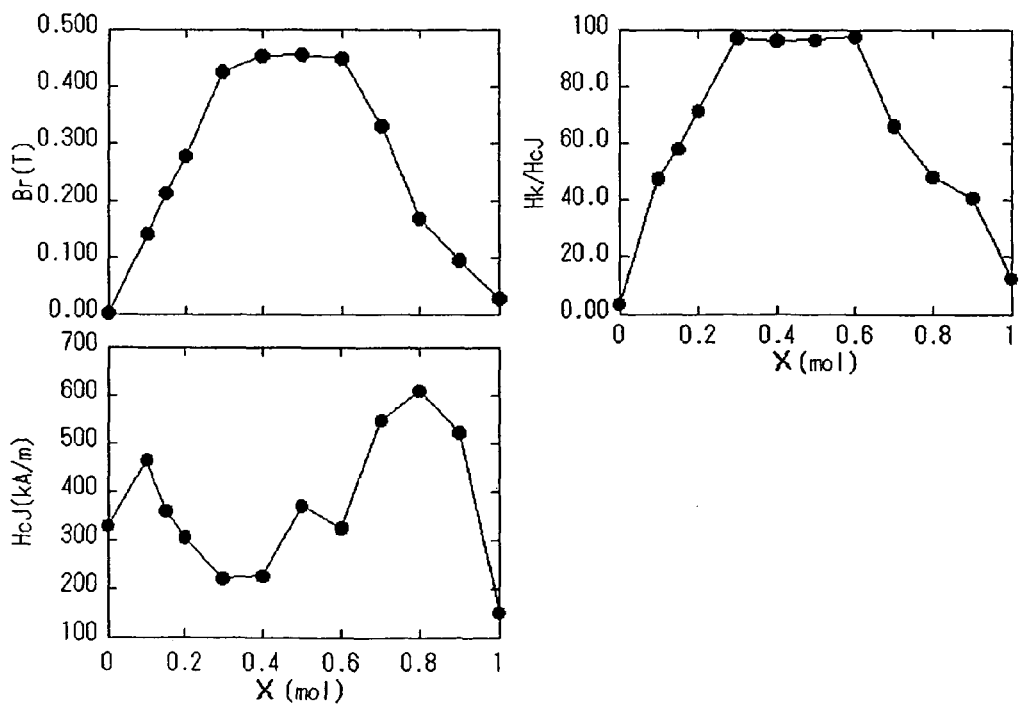
FIG. 4 is graphs showing how the remanence Br, coercivity HcJ and Hk/HcJ of a sintered magnet change with the mole fraction x in a situation where $0.00 \leq x \leq 1.0$, y=0.3 and n=5.2 in the composition $(1-x)CaO\cdot(x/2)La_2O_3\cdot(n-y/2)Fe_2O_3\cdot yCoO$.

As can be seen from FIG. 4, if the mole fraction x is too low or too high, Br and Hk/HcJ decrease significantly. It can also be seen that a high Hk/HcJ ratio of 95%, high Br and high HcJ are achieved when $0.4 \leq x \leq 0.6$ was substantially satisfied.

Example 5

Figure 5:
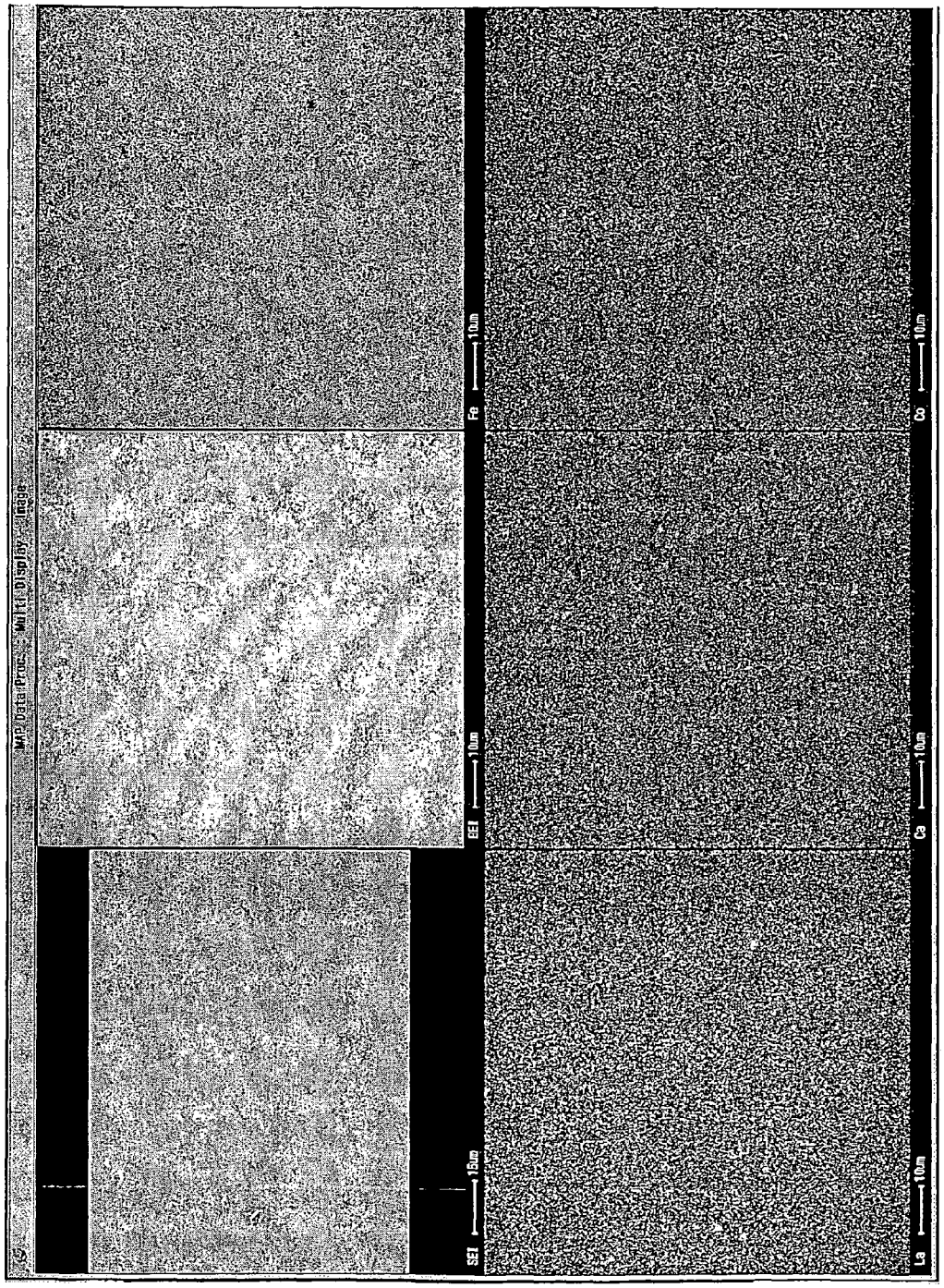
FIG. 5 is EPMA images of a sintered body in a situation where x=0.50, y=0.30, x/y=1.67, and n=5.2 in the composition $(1-x)CaO\cdot(x/2)La_2O_3\cdot(n-y/2)Fe_2O_3\cdot yCoO$ and shows the SEI image, BEI image and X-ray image of Fe, respectively, from left to right on the upper row and the X-ray images of La, Ca and Co, respectively, from left to right on the lower row.

A sintered magnet was produced as in the first specific example described above except that the composition $(1-x)CaO.(x/2)La_2O_3.(n-y/2)Fe_2O_3.yCoO$ satisfied x=0.5, y=0.3 or 0.2, x/y=1.67 or 2.5 and n=5.2. The sintered magnet obtained was subjected to a composition analysis using an EPMA. The results of this analysis are shown in FIG. 5 (in which x/y=1.67) and in FIG. 6 (in which x/y=2.5). The EPMA analysis was carried out using an electron probe microanalyzer EPMA 1610 (produced by Shimadzu Corp.) under the conditions including an accelerating voltage of 15 kV, a sample current of 0.1 μA, and an irradiation range φ of 100 μm (as represented by the electron beam diameter).

Figure 6:
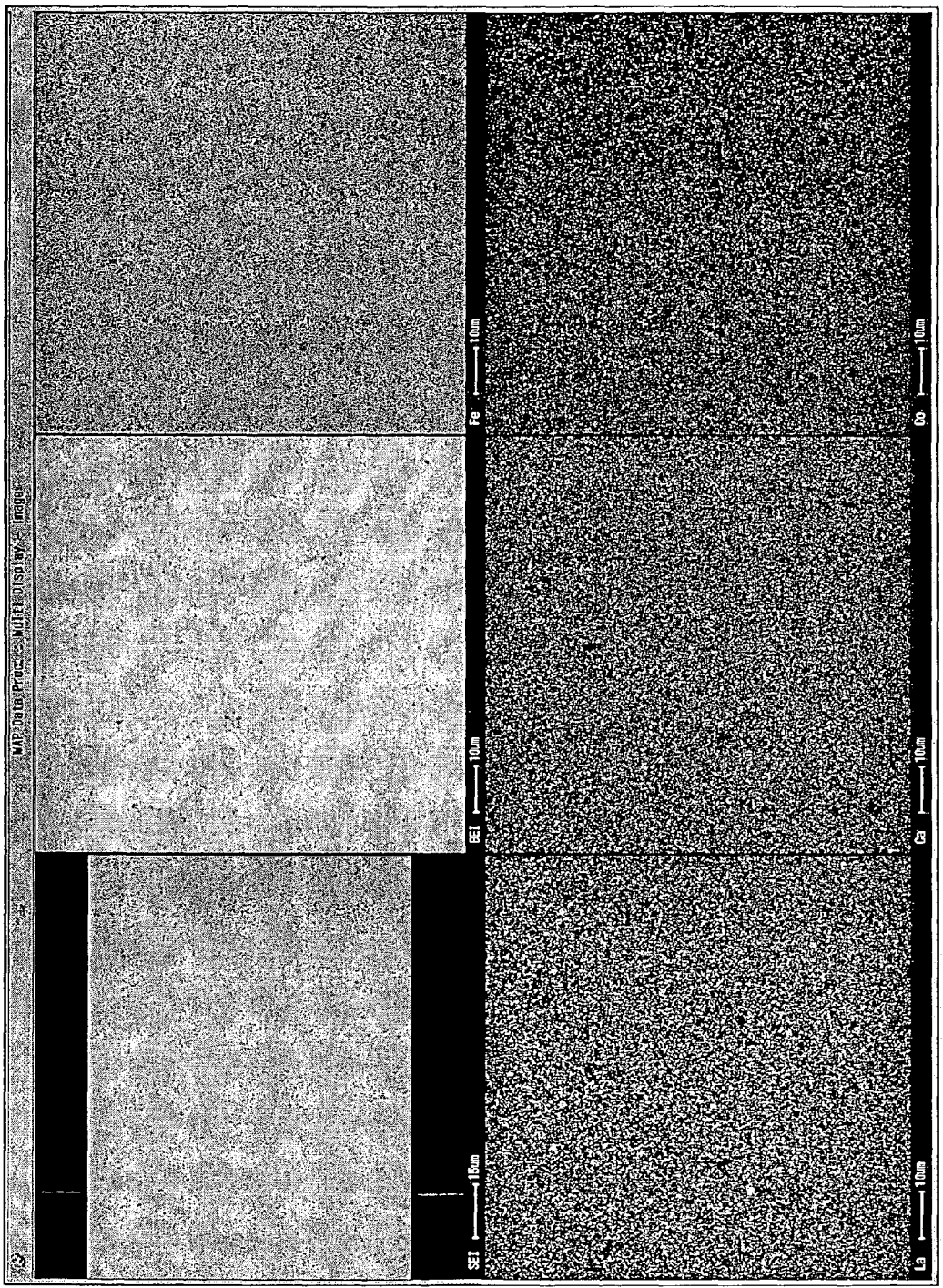
FIG. 6 is EPMA images of a sintered body in a situation where x=0.50, y=0.20, x/y=2.50, and n=5.2 in the composition $(1-x)CaO\cdot(x/2)La_2O_3\cdot(n-y/2)Fe_2O_3\cdot yCoO$ and shows the SEI image, BEI image and X-ray image of Fe, respectively, from left to right on the upper row and the X-ray images of La, Ca and Co, respectively, from left to right on the lower row.

As can be seen from FIGS. 5 and 6, no hetero phases including a lot of Co were identified in the sintered magnet of the present invention. Consequently, excellent magnetic properties were realized as in the first through fourth specific examples described above.

Comparative Example 1

Figure 7:
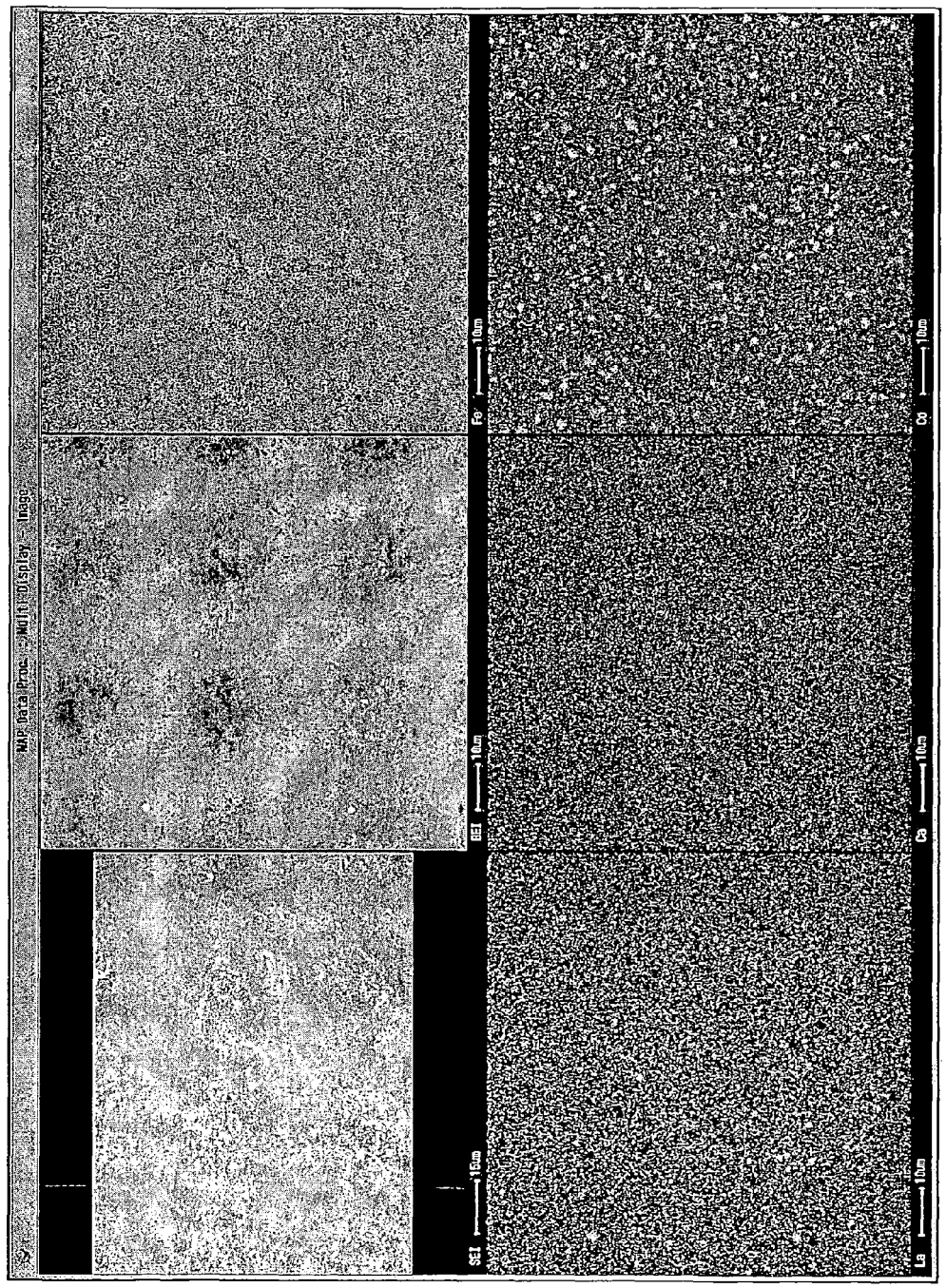
FIG. 7 is EPMA images of a sintered body in a situation where x=y=0.5, x/y=1, and n=5.4 in the composition $(1-x)CaO\cdot(x/2)La_2O_3\cdot(n-y/2)Fe_2O_3\cdot yCoO$ and shows the SEI image, BEI image and X-ray image of Fe, respectively, from left to right on the upper row and the X-ray images of La, Ca and Co, respectively, from left to right on the lower row.

A sintered magnet was produced as in the first specific example described above except that the composition $(1-x)CaO.(x/2)La_2O_3.(n-y/2)Fe_2O_3.yCoO$ satisfied x=0.5, y=0.5, x/y=1 and n=5.4. The sintered magnet obtained was subjected to a composition analysis using an EPMA. The results of this analysis are shown in FIG. 7. The EPMA analysis was carried out under the same conditions as those adopted in the fifth specific example.

As is clear from FIG. 7, a great number of hetero phases including a lot of Co (i.e., white spots on the photo at the lower right corner of FIG. 7) were identified in the sintered magnet of the comparative example. The magnetic properties of the sintered magnet were measured. As a result, Br was 0.441 T, HcJ was 325.5 kA/m (=4.09 kOe) and Hk/HcJ was 63%. Among other things, the Hk/HcJ ratio decreased significantly, which should be because of the presence of those hetero phases including a lot of Co.

Example 6

First, a $CaCO_3$ powder, an $La_2O_3$ powder, an $Fe_2O_3$ powder (with a particle size of 0.6 μm) and a $Co_3O_4$ powder were prepared such that a composition $(1-x)CaO.(x/2)La_2O_3.(n-y/2)Fe_2O_3.yCaO$ would satisfy x=0.5, y=0.3, x/y=1.67, and n=5.2. These material powders were combined together and 0 to 0.2 mass % of $H_3BO_3$ powder was further added thereto. The resultant material powders were mixed together in a wet ball mill for four hours, dried, and then sieved. Thereafter, the powder was calcined in the air at 1,150° C. for three hours, thereby obtaining a calcined body in the form of powder.

Next, 0.6 mass % of $CaCO_3$ powder (when converted into the mass of CaO) and 0.45 mass % of $SiO_2$ powder were further added to the calcined body. Then, using water as a solvent, the mixture was finely pulverized in a wet ball mill to a mean particle size of 0.55 μm as measured by the air permeability method. Thereafter, while the solvent was removed from the resultant finely pulverized slurry, the slurry was pressed and compacted under a magnetic field. The compaction process was performed such that the pressing direction became parallel to the direction of the magnetic field, which had a strength of 13 kOe. Next, the resultant compact was sintered in the air at 1,200° C. for one hour to make a sintered magnet.

The magnetic properties of the sintered magnet thus produced were measured. When the abscissa represents the amount of $H_3BO_3$ added, the remanence Br, coercivity HcJ and loop squareness Hk/HcJ measured change as shown in FIG. 8.

Figure 8:
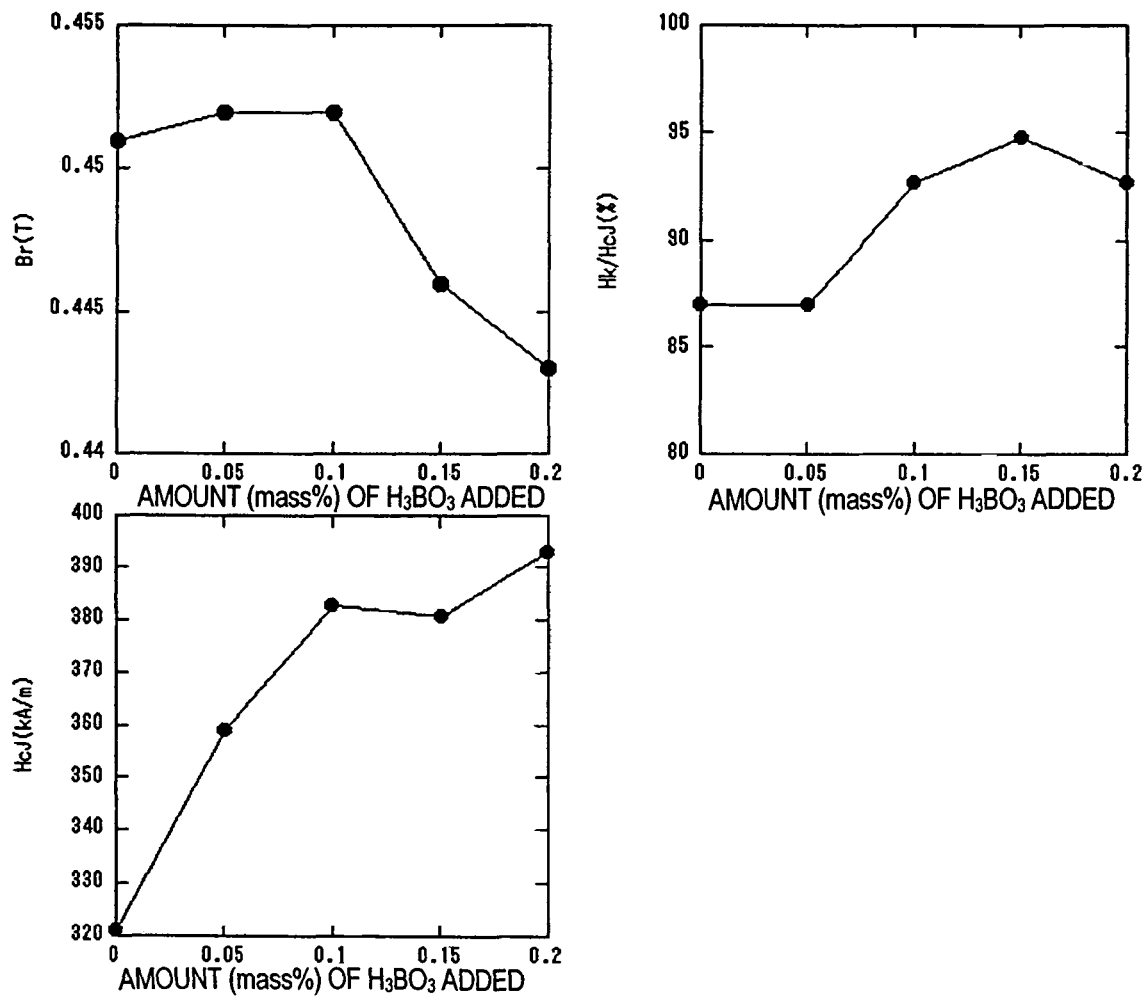
FIG. 8 is graphs showing how the remanence Br, coercivity HcJ and loop squareness Hk/HcJ of a sintered magnet change with the mole fraction of $H_3BO_3$ added.

As can be seen easily from FIG. 8, when 0.1 mass % of $H_3BO_3$ was added, Br and HcJ were both good. However, if $H_3BO_3$ was smaller than 0.1 mass %, Br increased but HcJ decreased. Conversely, if $H_3BO_3$ was greater than 0.1 mass %, HcJ increased but Br decreased. The loop squareness was 85% or more.

Example 7

A sintered magnet was produced as in the sixth specific example except that 0.1 mass % of $H_3BO_3$ powder, 0.5 mass % to 0.9 mass % of $CaCO_3$ powder (when converted into the mass of CaO) and 0.3 mass % to 0.9 mass % of $SiO_2$ powder were added. The magnetic properties of the sintered magnet thus produced were measured. When the abscissa represents the amount of $SiO_2$ added, the remanence Br, coercivity HcJ and loop squareness Hk/HcJ measured change as shown in FIG. 9, in which the solid circles represent a situation where 0.5 mass % of CaO was added, the solid triangles represent a situation where 0.7 mass % of CaO was added, and the solid squares represent a situation where 0.9 mass % of CaO was added.

Figure 9:
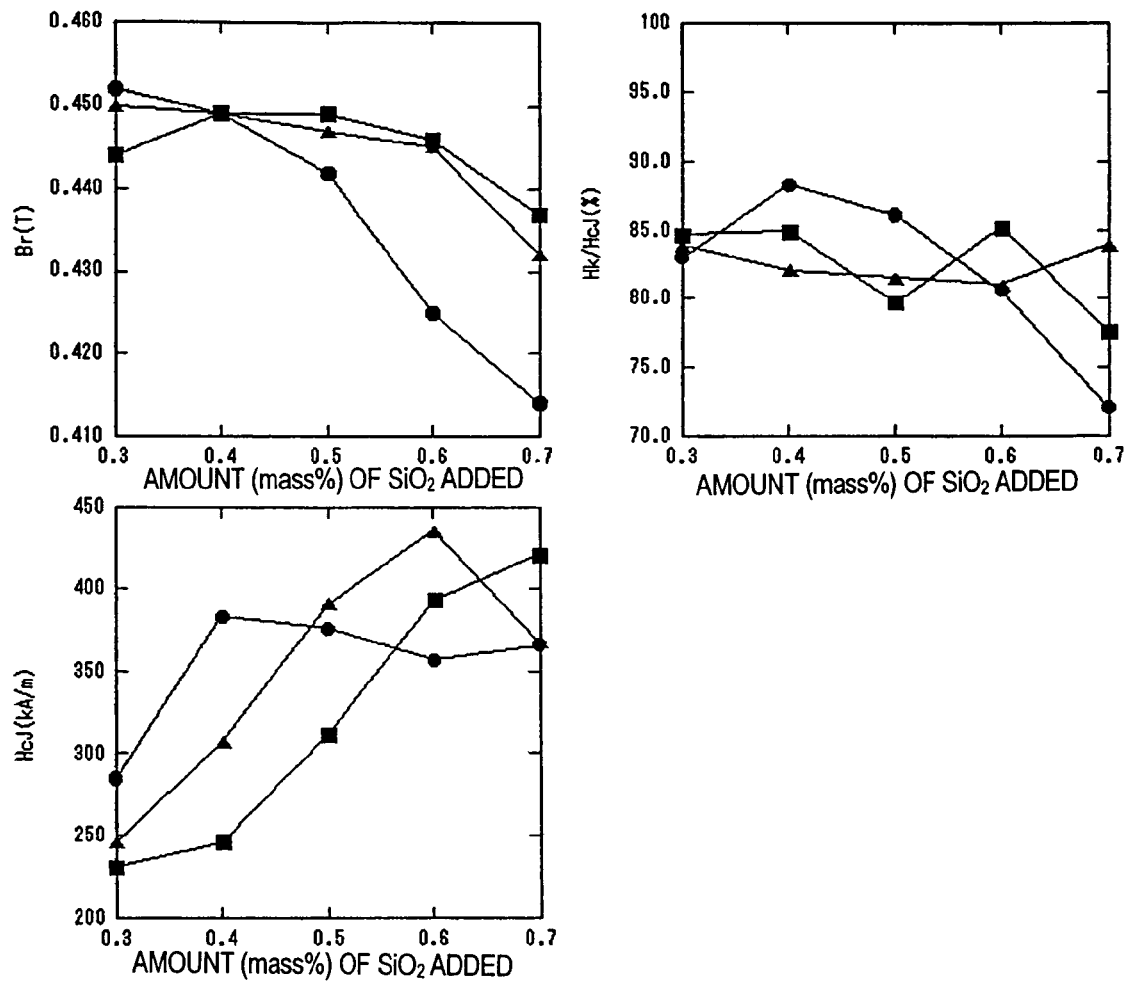
FIG. 9 is graphs showing how the remanence Br, coercivity HcJ and loop squareness Hk/HcJ of a sintered magnet change with the mole fractions of CaO and $SiO_2$ added.

As can be seen from FIG. 9, the CaLaCo ferrite of the present invention exhibited excellent properties when approximately 0.7 mass % of $CaCO_3$ (when converted into the mass of CaO) and approximately 0.6 mass % of $SiO_2$ were added.

Example 8

A sintered magnet was produced as in the first specific example except that 0.1 mass % of $H_3BO_3$ powder, 0.7 mass % of $CaCO_3$ powder (when converted into the mass of CaO) and 0.6 mass % of $SiO_2$ powder were added, the calcining temperature was 1,225° C. and the sintering temperature was either 1,190° C. or 1,200° C. The magnetic properties of the sintered magnet thus produced were measured. The results are shown in the following Table 2:

TABLE 2

| Sintering temperature (° C.) | Br (T) | Hcj (kA/m) | (BH)max (kJ/m$^3$) | Hk/HcJ (%) |
|---|---|---|---|---|
| 1190 | 0.449 | 436.4 | 39.4 | 92 |
| 1200 | 0.454 | 412.4 | 40.1 | 89 |

It can be seen that by adopting preferred calcining and sintering temperatures in combination with the preferred amounts of $CaCO_3$ and $SiO_2$ added in this seventh specific example, even better Br and HcJ were achieved.

Example 9

First, a $CaCO_3$ powder, an $La_2O_3$ powder, an $Fe_2O_3$ powder (with a particle size of 0.6 μm), an NiO powder and a $Co_3O_4$ powder were prepared such that a composition $(1-x)CaO.(x/2)La_2O_3.(n-y/2)Fe_2O_3.yCaO.y'NiO$ would satisfy x=0.5, y+y'=0.3, y'=0 to 0.1, x/y=1.67, and n=5.2. These material powders were combined together and 0.1 mass % of $H_3BO_3$ powder was further added thereto. The resultant material powders were mixed together in a wet ball mill for four hours, dried, and then sieved. Thereafter, the powder was calcined in the air at 1,150° C. for three hours, thereby obtaining a calcined body in the form of powder.

Next, 0.7 mass % of $CaCO_3$ powder (when converted into the mass of CaO) and 0.6 mass % of $SiO_2$ powder were further added to the calcined body. Then, using water as a solvent, the mixture was finely pulverized in a wet ball mill to a mean particle size of 0.55 μm as measured by the air permeability method. Thereafter, while the solvent was removed from the resultant finely pulverized slurry, the slurry was pressed and compacted under a magnetic field. The compaction process was performed such that the pressing direction became parallel to the direction of the magnetic field, which had a strength of 13 kOe. Next, the resultant compact was sintered in the air at 1,190° C. for one hour to make a sintered magnet.

The magnetic properties of the sintered magnet thus produced were measured. When the abscissa represents the mole fraction of y' (i.e., NiO added), the remanence Br, coercivity HcJ and loop squareness Hk/HcJ measured change as shown in FIG. 10.

Figure 10:
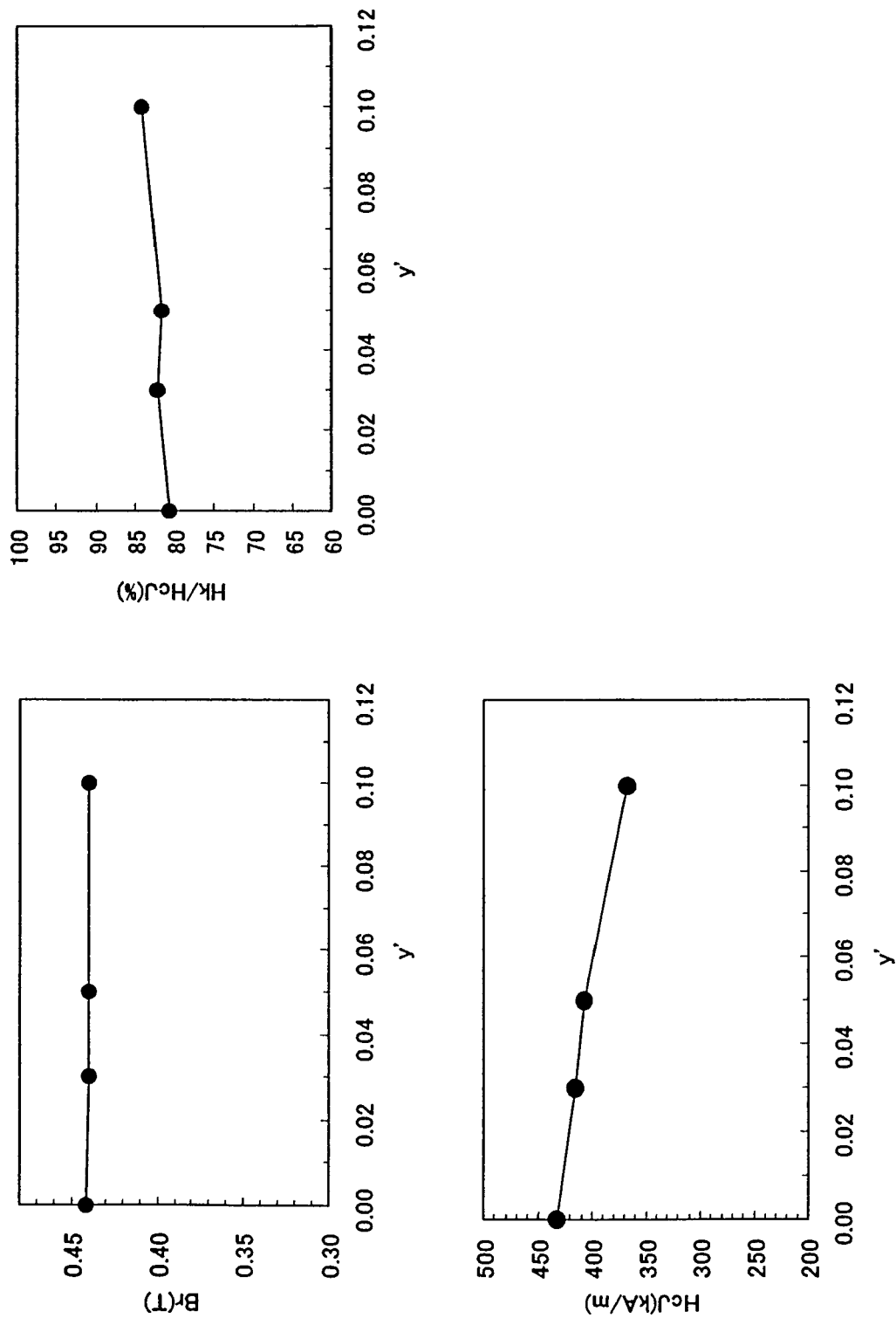
FIG. 10 is graphs showing how the remanence Br, coercivity HcJ and loop squareness Hk/HcJ of a sintered magnet change with the mole fraction y' of NiO.

As can be seen easily from FIG. 10, even if Co was replaced with Ni, neither Br nor HcJ decreased significantly. Ni is less expensive than Co. Thus, by replacing Co with Ni, the manufacturing cost can be reduced without deteriorating the magnetic properties.

INDUSTRIAL APPLICABILITY

The oxide magnetic material of the present invention has high remanence Br, high coercivity HcJ and good loop squareness, and therefore, can be used effectively to make high-performance motors, for example.

The invention claimed is:

1. A sintered magnet comprising an oxide magnetic material having a composition represented by the formula:

$(1-x)CaO.(x/2)R_2O_3.(n-y/2)Fe_2O_3.yMO$, where R is at least one element selected from the group consisting of La, Nd and Pr and always includes La,
M is at least one element selected from the group consisting of Co, Zn, Ni and Mn and always includes Co, and
the mole fractions x, y and n satisfy $0.4 \leq x \leq 0.6$, $0.2 \leq y \leq 0.35$, $4 \leq n \leq 6$, and $1.4 \leq x/y \leq 2.5$, wherein the oxide magnetic material consists essentially of a ferrite having a hexagonal M-type magnetoplumbite structure, and
wherein the sintered magnet has a coercivity HcJ of 370 kA/m or more.

2. The sintered magnet of claim 1, wherein $4.8 \leq n \leq 5.8$ is satisfied.

3. The sintered magnet of claim 1, wherein M is Co.

4. A sintered magnet comprising an oxide magnetic material having a composition represented by the formula:

$(1-x)CaO.(x/2)R_2O_3.(n-y/2)Fe_2O_3.yMO$, where R is at least one element selected from the group consisting of La, Nd and Pr and always includes La,
M is at least one element selected from the group consisting of Co, Zn, Ni and Mn and always includes Co, and
the mole fractions x, y and n satisfy $0.4 \leq x \leq 0.6$, $0.2 \leq y \leq 0.35$, $4 \leq n \leq 6$, and $1.4 \leq x/y \leq 2.5$, wherein the oxide magnetic material consists essentially of a ferrite having a hexagonal M-type magnetoplumbite structure, and
wherein the sintered magnet has a remanence Br of 0.45 T or more.

5. The sintered magnet of claim 4, wherein $4.8 \leq n \leq 5.8$ is satisfied.

6. The sintered magnet of claim 4, wherein M is Co.

7. A sintered magnet comprising an oxide magnetic material having a composition represented by the formula:

$(1-x)CaO.(x/2)R_2O_3.(n-y/2)Fe_2O_3.yMO$, where R is at least one element selected from the group consisting of La, Nd and Pr and always includes La,
M is at least one element selected from the group consisting of Co, Zn, Ni and Mn and always includes Co, and
the mole fractions x, y and n satisfy $0.4 \leq x \leq 0.6$, $0.2 \leq y \leq 0.35$, $4 \leq n \leq 6$, and $1.4 \leq x/y \leq 2.5$, wherein the oxide magnetic material consists essentially of a ferrite having a hexagonal M-type magnetoplumbite structure, and
wherein the sintered magnet has a loop squareness Hk/HcJ of at least 85%.

8. The sintered magnet of claim 7, wherein $4.8 \leq n \leq 5.8$ is satisfied.

9. The sintered magnet of claim 7, wherein M is Co.

10. The sintered magnet of claim 7, wherein the loop squareness Hk/HcJ is 90% or more.

* * * * *